(12) United States Patent
Jiang et al.

(10) Patent No.: US 7,828,634 B2
(45) Date of Patent: Nov. 9, 2010

(54) INTERCONNECTED-MULTI-ELEMENT-LATTICE POLISHING PAD

(75) Inventors: Bo Jiang, Newark, DE (US); Gregory P. Muldowney, Earleville, MD (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 754 days.

(21) Appl. No.: 11/893,785

(22) Filed: Aug. 16, 2007

(65) Prior Publication Data

US 2009/0047883 A1     Feb. 19, 2009

(51) Int. Cl.
*B24D 11/00*     (2006.01)
(52) U.S. Cl. ............... 451/532; 451/526; 451/527; 451/536; 451/537; 451/533
(58) Field of Classification Search ............... 451/285, 451/287, 526, 527, 529, 530, 531, 532, 533, 451/536, 537
See application file for complete search history.

(56) References Cited

U.S. PATENT DOCUMENTS

| | | | | |
|---|---|---|---|---|
| 2,740,239 A * | 4/1956 | Ball et al. | ............... | 451/536 |
| 2,984,052 A * | 5/1961 | Mueller, Jr. | ............... | 451/536 |
| 3,861,892 A * | 1/1975 | Wisdom et al. | ............... | 51/295 |
| 4,282,011 A * | 8/1981 | Terpay | ............... | 51/298 |
| 5,131,924 A * | 7/1992 | Wiand | ............... | 51/293 |
| 5,980,363 A * | 11/1999 | Meikle et al. | ............... | 451/41 |
| 6,190,246 B1 * | 2/2001 | Parrott et al. | ............... | 451/540 |
| 6,979,248 B2 * | 12/2005 | Hu et al. | ............... | 451/28 |
| 7,261,625 B2 * | 8/2007 | Hishiki | ............... | 451/526 |
| 7,517,277 B2 * | 4/2009 | Muldowney | ............... | 451/527 |
| 2003/0013397 A1 * | 1/2003 | Rhoades | ............... | 451/527 |
| 2004/0226620 A1 | 11/2004 | Therriault et al. | | |
| 2004/0259479 A1 | 12/2004 | Sevilla | | |
| 2006/0052040 A1 | 3/2006 | Prasad | | |
| 2006/0116059 A1 * | 6/2006 | Chen et al. | ............... | 451/532 |
| 2006/0178099 A1 * | 8/2006 | Hishiki | ............... | 451/521 |
| 2007/0190909 A1 | 8/2007 | Muldowney | | |
| 2007/0190916 A1 | 8/2007 | Muldowney | | |
| 2008/0026681 A1 * | 1/2008 | Butterfield et al. | ............... | 451/527 |
| 2008/0108288 A1 * | 5/2008 | Hu et al. | ............... | 451/548 |

* cited by examiner

*Primary Examiner*—Eileen P. Morgan
(74) *Attorney, Agent, or Firm*—Blake T. Biederman

(57) ABSTRACT

The polishing pad (104) is useful for polishing at least one of magnetic, optical and semiconductor substrates (112) in the presence of a polishing medium (120). The polishing pad (104) includes a plurality of polishing elements (402, 502, 602, 702). The polishing elements (402, 502, 602, 702) are aligned in a vertical direction and having a first and a second end. A plurality of junctions (404, 510, 610, 710) connects the first and second ends of the polishing elements (402, 502, 602, 702) with at least three polishing elements at each of the plurality of junctions (404, 510, 610, 710) for forming a tier. Each tier representing a thickness in the vertical direction between the first and second ends of the polishing elements (402, 502, 602, 702). And an interconnected lattice structure (400, 600) forms from connecting sequential tiers of the plurality of junctions (404, 504) that connect the polishing elements (402, 502, 602, 702).

10 Claims, 10 Drawing Sheets

INTERCONNECTED-MULTI-ELEMENT-LATTICE POLISHING PAD

BACKGROUND OF THE INVENTION

The present invention relates generally to the field of polishing pads for chemical mechanical polishing. In particular, the present invention is directed to a chemical mechanical polishing pad having a polishing structure useful for chemical mechanical polishing magnetic, optical and semiconductor substrates.

In the fabrication of integrated circuits and other electronic devices, multiple layers of conducting, semiconducting and dielectric materials are deposited onto and removed from a surface of a semiconductor wafer. Thin layers of conducting, semiconducting and dielectric materials may be deposited using a number of deposition techniques. Common deposition techniques in modern wafer processing include physical vapor deposition (PVD), also known as sputtering, chemical vapor deposition (CVD), plasma-enhanced chemical vapor deposition (PECVD) and electrochemical plating, among others. Common removal techniques include wet and dry isotropic and anisotropic etching, among others.

As layers of materials are sequentially deposited and removed, the uppermost surface of the wafer becomes non-planar. Because subsequent semiconductor processing (e.g., metallization) requires the wafer to have a flat surface, the wafer needs to be planarized. Planarization is useful for removing undesired surface topography and surface defects, such as rough surfaces, agglomerated materials, crystal lattice damage, scratches and contaminated layers or materials.

Chemical mechanical planarization, or chemical mechanical polishing (CMP), is a common technique used to planarize or polish workpieces such as semiconductor wafers. In conventional CMP, a wafer carrier, or polishing head, is mounted on a carrier assembly. The polishing head holds the wafer and positions the wafer in contact with a polishing layer of a polishing pad that is mounted on a table or platen within a CMP apparatus. The carrier assembly provides a controllable pressure between the wafer and polishing pad. Simultaneously, a slurry or other polishing medium is dispensed onto the polishing pad and is drawn into the gap between the wafer and polishing layer. To effect polishing, the polishing pad and wafer typically rotate relative to one another. As the polishing pad rotates beneath the wafer, the wafer sweeps out a typically annular polishing track, or polishing region, wherein the wafer's surface directly confronts the polishing layer. The wafer surface is polished and made planar by chemical and mechanical action of the polishing layer and polishing medium on the surface.

The interaction among polishing layers, polishing media and wafer surfaces during CMP has been the subject of increasing study, analysis, and advanced numerical modeling in the past ten years in an effort to optimize polishing pad designs. Most of the polishing pad developments since the inception of CMP as a semiconductor manufacturing process have been empirical in nature, involving trials of many different porous and non-porous polymeric materials. Much of the design of polishing surfaces, or layers, has focused on providing these layers with various microstructures, or patterns of void areas and solid areas, and macrostructures, or arrangements of surface perforations or grooves, that are claimed to increase polishing rate, improve polishing uniformity, or reduce polishing defects (scratches, pits, delaminated regions, and other surface or sub-surface damage). Over the years, quite a few different microstructures and macrostructures have been proposed to enhance CMP performance.

For conventional polishing pads, pad surface "conditioning" or "dressing" is critical to maintaining a consistent polishing surface for stable polishing performance. Over time the polishing surface of the polishing pad wears down, smoothing over the microtexture of the polishing surface—a phenomenon called "glazing". The origin of glazing is plastic flow of the polymeric material due to frictional heating and shear at the points of contact between the pad and the workpiece. Additionally, debris from the CMP process can clog the surface voids as well as the micro-channels through which slurry flows across the polishing surface. When this occurs, the polishing rate of the CMP process decreases, and this can result in non-uniform polishing between wafers or within a wafer. Conditioning creates a new texture on the polishing surface useful for maintaining the desired polishing rate and uniformity in the CMP process.

Conventional polishing pad conditioning is achieved by abrading the polishing surface mechanically with a conditioning disk. The conditioning disk has a rough conditioning surface typically comprised of imbedded diamond points. The conditioning disk is brought into contact with the polishing surface either during intermittent breaks in the CMP process when polishing is paused ("ex situ"), or while the CMP process is underway ("in situ"). Typically the conditioning disk is rotated in a position that is fixed with respect to the axis of rotation of the polishing pad, and sweeps out an annular conditioning region as the polishing pad is rotated. The conditioning process as described cuts microscopic furrows into the pad surface, both abrading and plowing the pad material and renewing the polishing texture.

Although pad designers have produced various microstructures and configurations of surface texture through both pad material preparation and surface conditioning, existing CMP pad polishing textures are less than optimal in two important aspects. First, the actual contact area between a conventional CMP pad and a typical workpiece under the applied pressures practiced in CMP is small—usually only a few percent of the total confronting area. This is a direct consequence of the inexactness of conventional surface conditioning that amounts to randomly tearing the solid regions of the structure into tatters, leaving a population of features, or asperities, of various shapes and heights of which only the tallest actually contact the workpiece. Second, the space available for slurry flow to convey away polish debris and heat occupies a thin layer at the pad surface such that polishing waste remains in close proximity with the workpiece until it passes completely out from under the workpiece. Slurry flow between the pad and workpiece must pass across the highly irregular surface and around any asperities that bridge the full vertical distance from the pad to the workpiece. This results in a high probability that the workpiece is re-exposed to both spent chemistry and material previously removed. Thus conventional pad microstructures are not optimal because contact mechanics and fluid mechanics within the surface texture are coupled: the height distribution of asperities favors neither good contact nor effective fluid flow and transport.

Defect formation in CMP has origins in both shortcomings of conventional pad microstructure. For example, Reinhardt et al., in U.S. Pat. No. 5,578,362, disclose the use of polymeric spheres to introduce texture into a polyurethane polishing pad. Although exact defect formation mechanisms are incompletely understood, it is generally clear that reducing defect formation requires minimizing extreme point stresses on the workpiece. Under a given applied load or polish pressure, the actual point contact pressure is inversely proportional to the true contact area. A CMP process running at 3 psi (20.7 kPa) polish pressure and having 2% real contact area across all asperity tips actually subjects the workpiece to normal stresses averaging 150 psi (1 MPa). Stresses of this magnitude are sufficient to cause surface and sub-surface damage. Being blunt and irregular in shape, asperities on conventional CMP pads also lead to unfavorable flow patterns: localized pressures of fluid impinging on asperities can be significant, and regions of stagnant or separated flow can lead to accumulation of polish debris and heat or create an environment for particle agglomeration.

Beyond providing potential defect formation sources, conventional polishing pad microtexture is not optimal because pad surface conditioning is typically not exactly reproducible. The diamonds on a conditioning disk become dulled with use such that the conditioner must be replaced after a period of time; during its life the effectiveness of the conditioner thus continually changes. Conditioning also contributes greatly to the wear rate of a CMP pad. It is common for about 95% of the wear of a pad to result from the abrasion of the diamond conditioner and only about 5% from contact with workpieces. Thus in addition to defect reduction, improved pad microstructure could eliminate the need for conditioning and allow longer pad life.

The key to eliminating pad conditioning is to devise a polishing surface that is self-renewing, that is, that retains the same essential geometry and configuration as it wears. Thus to be self-renewing, the polishing surface must be such that wear does not significantly reshape the solid regions. This in turn requires that the solid regions not be subjected to continuous shear and heating sufficient to cause a substantial degree of plastic flow, or that the solid regions be configured so that they respond to shear or heating in a way that distributes the shear and heating to other solid regions.

In addition to low defectivity, CMP pad polishing structures must achieve good planarization efficiency. Conventional pad materials require a trade-off between these two performance metrics because lower defectivity is achieved by making the material softer and more compliant, yet these same property changes compromise planarization efficiency. Ultimately, planarization requires a stiff flat material; while low defectivity requires a less stiff conformal material. It is thus difficult to surmount the essential trade-off between these metrics with a single material. Conventional pad structures approach this problem in a variety of ways, including the use of composite materials having hard and soft layers bonded to one another. While composites offer improvements over single-layer structures, no material has yet been developed that achieves ideal planarization efficiency and zero defect formation simultaneously.

Consequently, while pad microstructure and conditioning means exist for contemporary CMP applications, there is a need for CMP pad designs that achieve higher real contact area with the workpiece and more effective slurry flow patterns for removal of polish debris, as well as reducing or eliminating the need for re-texturing. In addition, there is a need for CMP pad structures that combine a rigid stiff structure needed for good planarization efficiency with a less stiff conformal structure needed for low defectivity.

Recently, lattice designs have been proposed in an effort to improve planarization while achieving low defectivity. This invention addresses a potentially suboptimal feature of some lattice designs, namely that lattices based on a repeating unit cell that is cross-buttressed to achieve high stiffness may contain members that occupy a horizontal or near-horizontal orientation at regularly spaced elevations within the structure. This feature may be undesirable for some CMP applications because as the lattice wears, an abundance of horizontal members within one plane leads to an atypically high contact area with the workpiece. It is preferred to have a contact area that varies only slightly as the structure wears away, so that pad-workpiece contact area and pressure are largely invariant.

Two approaches to prevent many horizontal members from occupying one plane are (1) staggering the elevation of members, and (2) sloping the base layer of the lattice so that otherwise horizontal members take on a significant angle. While these approaches are feasible, they have limitations. Staggering the members spreads the contact area variations over more elevations, but disrupts a simple unit cell structure and increases manufacturing complexity and time. Sloping the base layer is practical only over short lateral expanses, hence a periodically sloped base is actually required which leads to special-case members in the lattice structure. This feature again increases manufacturing complexity and time, and may compromise the global stiffness of the lattice. There is an ongoing need for lattice polishing structures that can deliver consistent polishing performance for multiple polishing cycles while facilitating planarization without introducing excessive defectivity into the substrate.

STATEMENT OF THE INVENTION

An aspect of the invention provides a polishing pad useful for polishing at least one of a magnetic, optical and semiconductor substrate in the presence of a polishing medium, the polishing pad comprising: a) a plurality of polishing elements, the polishing elements being aligned in a vertical direction and having a first and a second end; b) a plurality of junctions connecting the first and second ends of the polishing elements with at least three polishing elements at each of the plurality of junctions and forming a tier, each tier representing a thickness in the vertical direction between the first and second ends of the polishing elements; and c) an interconnected lattice structure formed from connecting sequential tiers of the plurality of junctions that connect the polishing elements.

Another aspect of the invention provides a polishing pad useful for polishing at least one of a magnetic, optical and semiconductor substrate in the presence of a polishing medium, the polishing pad comprising: a) a plurality of polishing elements, the polishing elements being aligned in a vertical direction and having a first and a second end; b) a plurality of junctions connecting the first and second ends of the polishing elements with at least three polishing elements at each of the plurality of junctions and forming a tier, each tier representing a thickness in the vertical direction between the first and second ends of the polishing elements; and c) an interconnected lattice structure formed from connecting sequential tiers of the plurality of junctions that connect the polishing elements with the polishing elements aligning in a constant direction through multiple junctions.

DETAILED DESCRIPTION OF THE INVENTION

Figure 1:
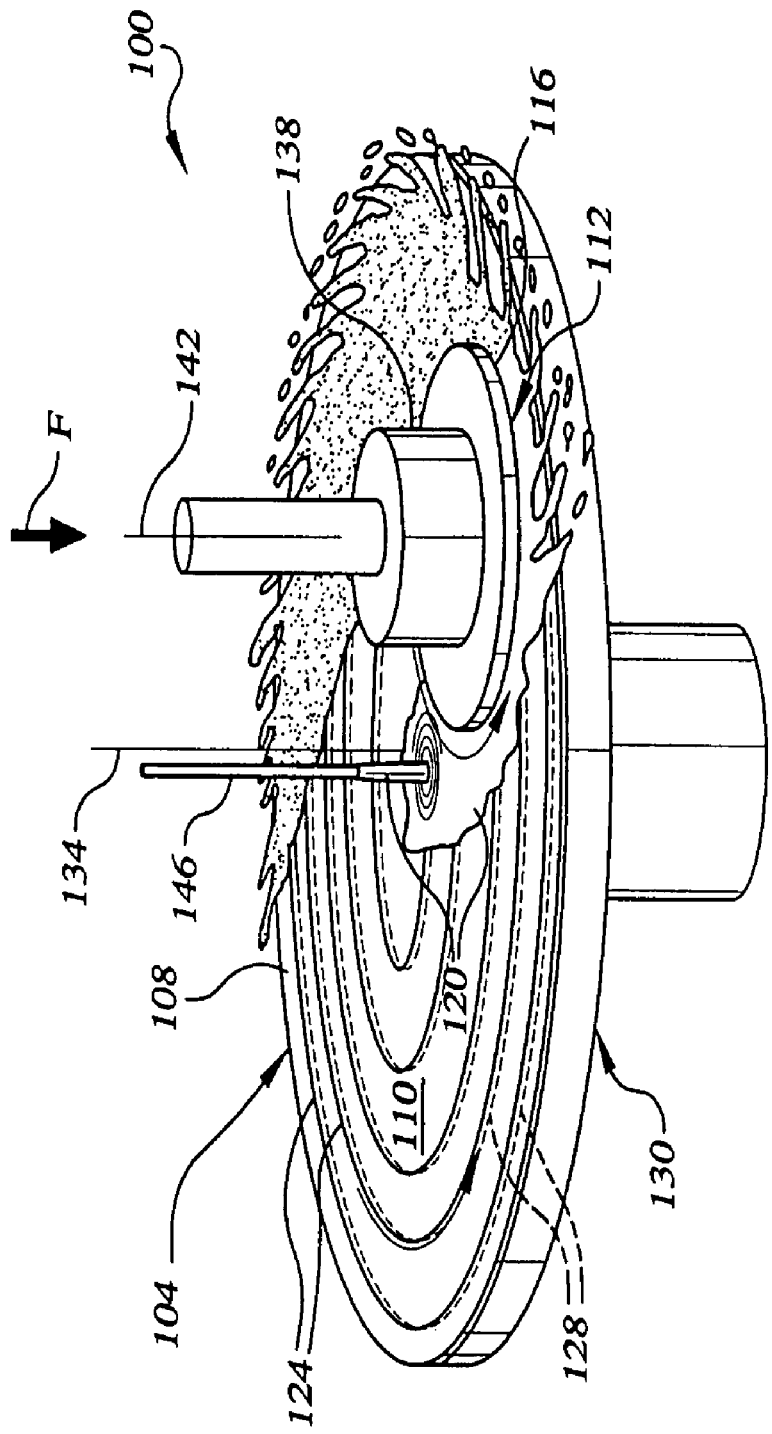
FIG. 1 is a perspective view of a portion of a dual-axis polisher suitable for use with the present invention.

Referring to the drawings, FIG. 1 illustrates the primary features of a dual-axis chemical mechanical polishing (CMP) polisher 100 suitable for use with a polishing pad 104 of the present invention. Polishing pad 104 generally includes a polishing layer 108 having a polishing surface 110 for confronting an article, such as semiconductor wafer 112 (processed or unprocessed) or other workpiece, e.g., glass, flat panel display or magnetic information storage disk, among others, so as to effect polishing of the polished surface 116 of the workpiece in the presence of a polishing medium 120. Polishing medium 120 travels through optional spiral groove 124 having a depth 128. For the sake of convenience, the term "wafer" is used below without the loss of generality. In addition, as used in this specification, including the claims, the term "polishing medium" includes particle-containing polishing solutions and non-particle-containing solutions, such as abrasive-free and reactive-liquid polishing solutions.

The present invention includes providing polishing layer 108 with a polishing texture 200 (FIG. 2) having a high void fraction or percentage of open volume versus solid volume by forming polishing layer 108 from a series of similar or identical macroscopic or microscopic slender elements, each element constrained at one or more ends, such that the total space occupied by the elements is small relative to the total space available, the spacing of individual elements is small relative to the size of the wafer, and the elements are interconnected in three dimensions to stiffen the network with respect to shear and bending. Preferably, the elements have microscopic dimensions to create a microtexture. These features will be shown to provide both higher real contact area between the pad and wafer and more favorable slurry flow patterns between the pad and wafer than are realized using conventional polishing pads, as well as providing a self-renewing structure that can eliminate the need for diamond pad conditioning. In addition, these features will be shown to function in a way that imparts stiffness to the pad at the length scale required for good planarization efficiency while allowing compliance at the shorter length scales required for low defectivity.

Polisher 100 may include polishing pad 104 mounted on platen 130. Platen 130 is rotatable about a rotational axis 134 by a platen driver (not shown). Wafer 112 may be supported by a wafer carrier 138 that is rotatable about a rotational axis 142 parallel to, and spaced from, rotational axis 134 of platen 130. Wafer carrier 138 may feature a gimbaled linkage (not shown) that allows wafer 112 to assume an aspect very slightly non-parallel to polishing layer 108, in which case rotational axes 134, 142 may be very slightly askew. Wafer 112 includes polished surface 116 that faces polishing layer 108 and is planarized during polishing. Wafer carrier 138 may be supported by a carrier support assembly (not shown) adapted to rotate wafer 112 and provide a downward force F to press polished surface 116 against polishing layer 108 so that a desired pressure exists between the polished surface and the polishing layer during polishing. Polisher 100 may also include a polishing medium inlet 146 for supplying polishing medium 120 to polishing layer 108.

Polisher 100 may include other components (not shown) such as a system controller, polishing medium storage and dispensing system, heating system, rinsing system and various controls for controlling various aspects of the polishing process, such as follows: (1) speed controllers and selectors for one or both of the rotational rates of wafer 112 and polishing pad 104; (2) controllers and selectors for varying the rate and location of delivery of polishing medium 120 to the pad; (3) controllers and selectors for controlling the magnitude of force F applied between the wafer and polishing pad, and (4) controllers, actuators and selectors for controlling the location of rotational axis 142 of the wafer relative to rotational axis 134 of the pad, among others.

During polishing, polishing pad 104 and wafer 112 are rotated about their respective rotational axes 134, 142 and polishing medium 120 is dispensed from polishing medium inlet 146 onto the rotating polishing pad. Polishing medium 120 spreads out over polishing layer 108, including the gap beneath wafer 112 and polishing pad 104. Polishing pad 104 and wafer 112 are typically, but not necessarily, rotated at selected speeds of 0.1 rpm to 150 rpm. Force F is typically, but not necessarily, of a magnitude selected to induce a desired pressure of 0.1 psi to 15 psi (6.9 to 103 kPa) between wafer 112 and polishing pad 104. As those in the art will recognize, it is possible to configure the polishing pad in a web format or into polishing pads having a diameter less than the diameter of the substrate being polished.

Figure 2:
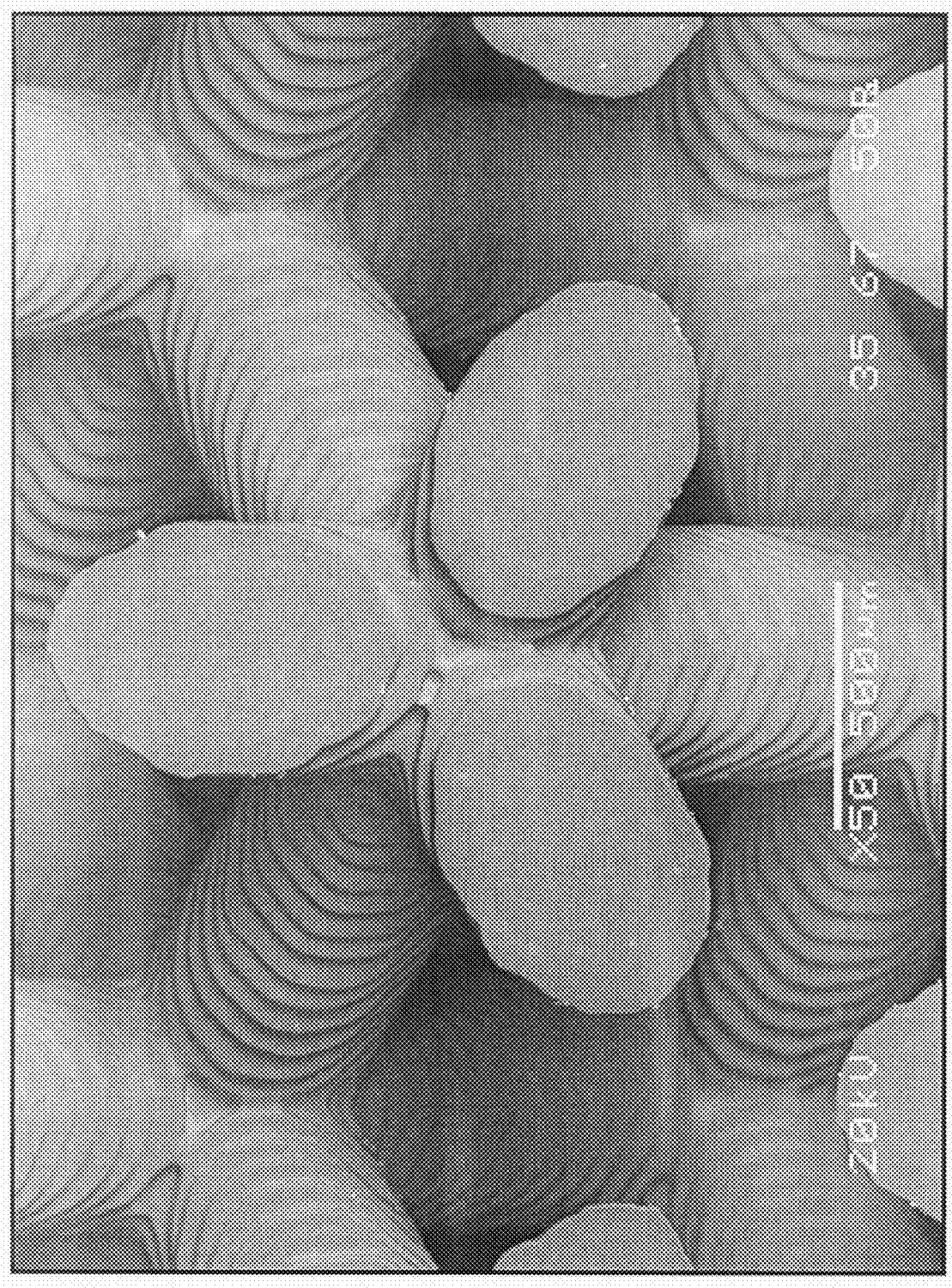
FIG. 2 is a top view SEM micrograph of an interconnected-multi-element lattice network of the invention under 50× magnification.
Figure 3:
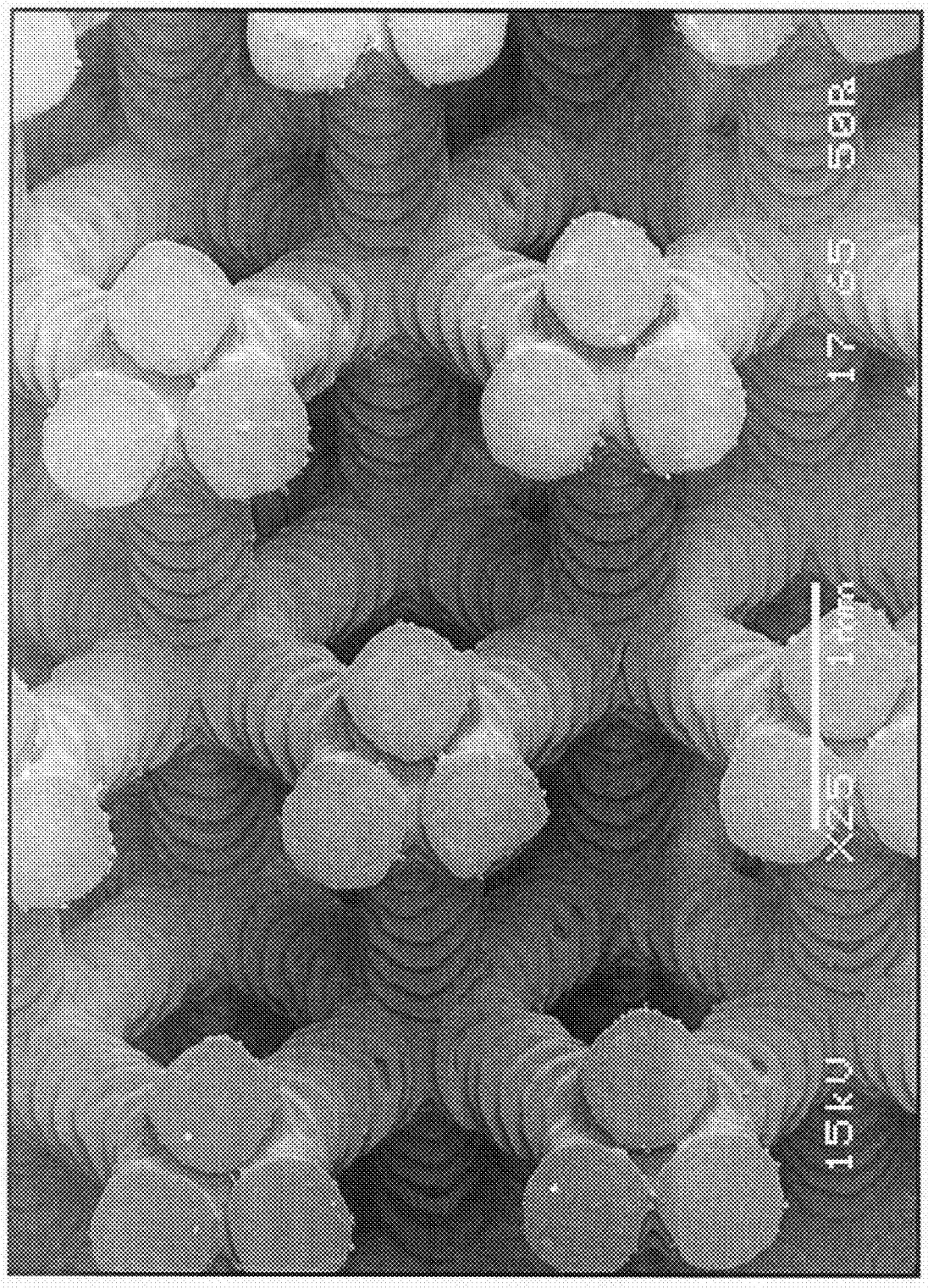
FIG. 3 is a top view SEM micrograph of an interconnected-multi-element lattice network of the invention under 25× magnification.

While structures may be conceived that lack horizontal members, they often lack internal buttressing that imparts high stiffness. It is therefore desired to have a structure without strictly horizontal members but that realizes sufficient internal buttressing to reach the stiffness of a cross-braced structure. FIGS. 2 and 3 illustrate the interconnected lattice structure of the invention with oval and circular cross-sections in a horizontal plane, respectively. In particular, these SEM micrographs illustrate polishing elements fabricated from a series of steps or landings, such as circular landings. FIGS. 2 and 3 illustrate horizontal landings, but the lattice structure does not require landings or that the landings be horizontal. Each end of the polishing element connects at a vertex or junction with two other polishing elements. This forms an interconnected tetrahedral lattice with three polishing elements supporting each junction. The structure's lack of horizontal elements reduces the variation in contact area as the structure wears and facilitates consistent polishing for multiple wafers.

In general, a favorably consistent contact area is combined with the benefits of cross-bracing in the present invention by constructing a lattice of multi-element members that form less than a 60-degree angle with the vertical. For purposes of this specification, polishing members forming greater than a 60-degree angle with the vertical constitute a horizontal polishing member. Preferably, the lattice structure has no horizontal polishing members, except for polishing members that have locally deformed during polishing. Preferably, the polishing members form less than a 45-degree angle with vertical. Most preferably, the polishing members form less than a 30-degree angle with vertical. Each multi-element assembly consists of at least three members joined at a common vertex. Preferably, each member has the same length and forms the same angle with the vertical. Alternatively, members may have unequal lengths and form different angles with the vertical. Most preferred are multi-element assemblies having three to six, such as three, four, or six polishing members because these occupy triangular, square, and hexagonal spaces respectively and allow identical units to fill a volume without gaps. To form the full lattice, the feet of each multi-element assembly rest on the junctions or vertices of the multi-element assemblies in the tier below. In this way, for example, a trigonal lattice is formed from tripods by first arranging tripods in ordered rows to form a first tier, then forming a second tier of tripods in which each tripod rests on three vertices of the first tier that form a triangle.

Figure 4:
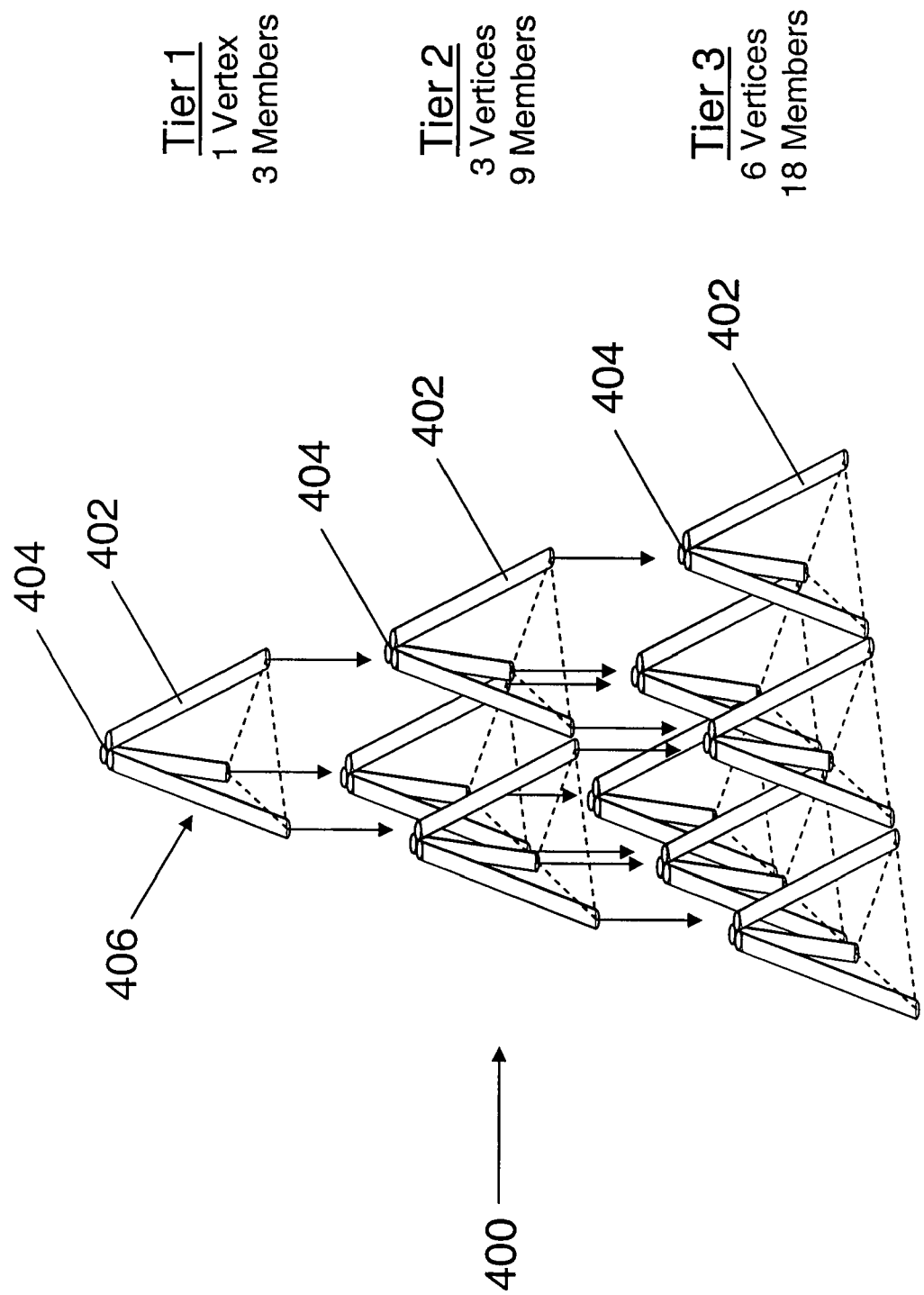
FIG. 4 is a schematic illustration of three tiers of an interconnected-multi-element lattice network of the invention having three polishing elements per junction with the tiers separated for illustrative purposes.
Figure 4A:
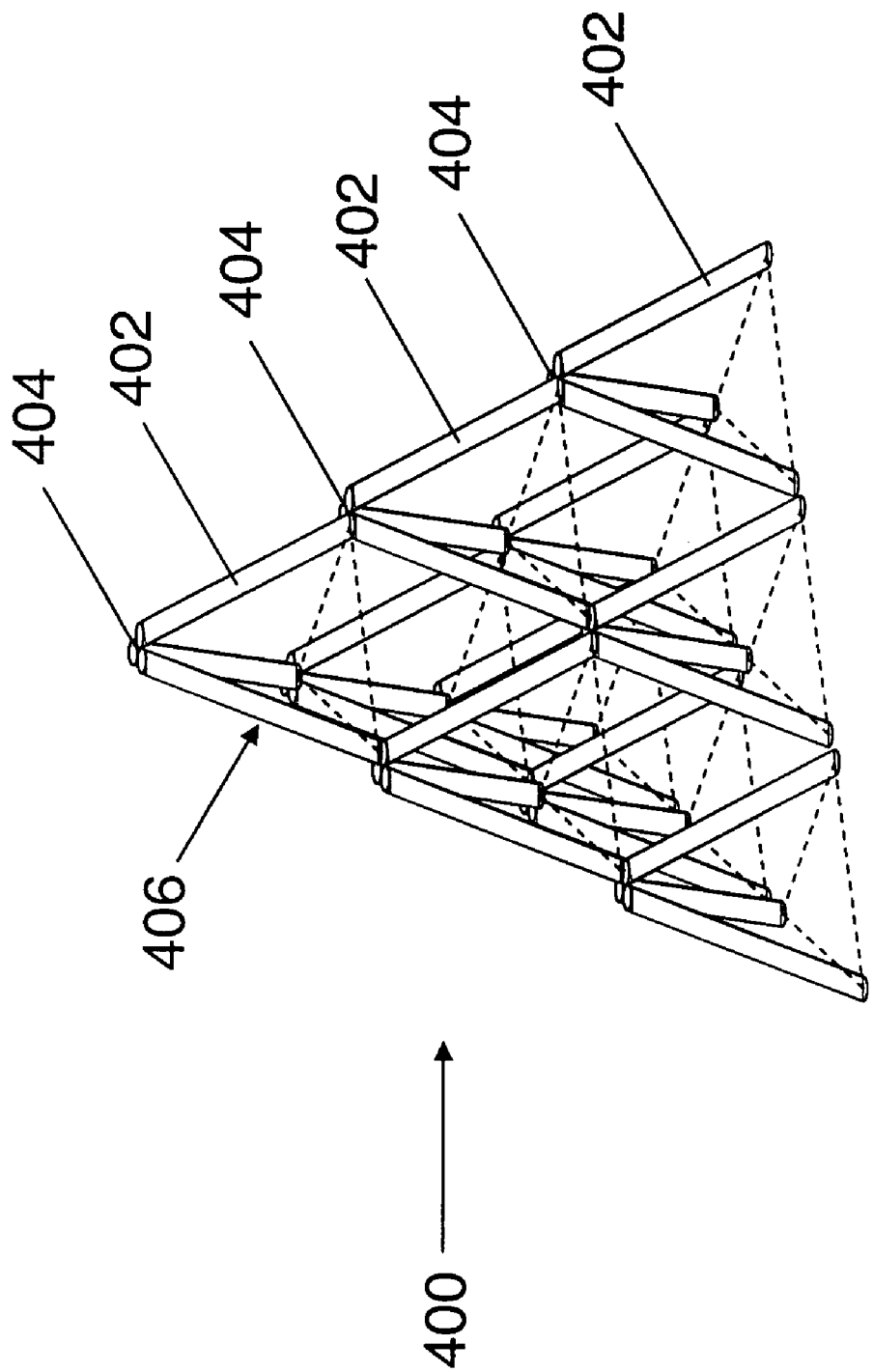
FIG. 4A is a schematic illustration of three tiers of an interconnected-multi-element lattice network of FIG. 4 with the polishing elements connected at junctions.

Referring now to FIGS. 4 and 4A, embodiments of polishing pad 104 of FIG. 1 will be described in more detail, in particular relative to lattice polishing structure 400. In contrast to CMP pads of prior art in which surface texture or asperities are the residue of a material removal or reshaping process (i.e. diamond conditioning), lattice polishing structure 400 is built as a series of identical or similar polishing elements 402 having a precise geometry. The polishing elements 402 combine at their vertices to form junctions 404. Each junction 404 includes at least three polishing elements 402. The junctions 404 each include three polishing elements. The lattice polishing structure 400 is in effect a set of tetrahedral unit cells, that is spatial units in which each face (of four) is a triangle and solid members run along the edges only of the spatial unit, leaving the center of each face and of the spatial unit as a whole empty.

Cross-buttressing is achieved in the stacked multi-element lattice structure because each junction or vertex 404 branches to a set of other junctions 404 which in turn branch to a broader set and so forth. Preferably, the polishing members align from tier-to-tier at each multi-element junction. Load applied to a junction or vertex 404 on the top tier of the lattice structure 400 is distributed into a geometrically expanding number of junctions or vertices 404 in each tier below. For example, in a trigonal lattice structure 400, load applied to a junction or vertex 404 in the top tier is transmitted through three elements 402 to three junctions or vertices 404 in the next tier. From each of these, the load is transmitted through three member cells, or nine polishing elements 402 total, to six junctions or vertices 404 in the next tier. From these six junctions or vertices 404, load is transmitted through eighteen polishing elements 402 to ten junctions or vertices 404 in the next tier, and so forth. This feature of load distribution makes the lattice structure 400 as a whole desirably stiff, an asset to high planarization efficiency. However at the top tier, the slender members are locally flexible and allow good contact with the workpiece and excellent defectivity performance.

In general, only the unconstrained ends of elements 402 projecting beyond the uppermost junctions 404 are free to flex under shear forces during polishing. The heights of elements 402 below the uppermost junctions 404 are highly constrained and forces applied to any one element 402 are effectively carried by many adjacent elements 402 through multiple tiers or layers of polishing elements similar to a bridge truss or external buttressing. In this way lattice polishing structure 400 is rigid at the length scale required for good planarization, but is locally compliant at shorter length scales by virtue of the local deformability and flexibility of the unbuttressed ends of elements 402.

The interconnecting elements 402 combine to form a unit cell 406, the unit cell having a mean width and a mean height. These unit cells have a reticulated or open-cell structure that combine to form the three-dimensional lattice network. Lattice polishing structure 400 has a height of at least three unit cells and preferably at least 10 unit cells. Generally, increasing the height of the polishing pad increases the life of the polishing pad as well as its bulk stiffness, the latter contributing to improved planarization. Optionally, the unit cell's mean width does not equal its mean height. For example a mean width to mean height ratio may be of at least 2 or of at least 4 to further improve polishing performance for some polishing applications. For example, unit cells with an extended horizontal width will tend to provide stiffer polishing elements for improved planarization; and unit cells with extended vertical height will tend to have more flexible polishing members for improved defectivity performance.

An advantage of the high mean height to mean width ratio of elements 402 is that the total polishing surface area remains constant for an extended period. For purposes of this specification, the polishing surface represents the surface area of polishing elements 402 measured in a plane parallel to the polishing surface. As shown in FIG. 4A, at any point in the life of the polishing layer, most or all of the contacting area of lattice polishing texture 400 consists of the cross-sections of upright elements 402 if the plane of wear lies within the height of one tier of elements, and consists of the cross-sections of junctions 404 if the plane of wear lies at the elevation of the junctions 404. Optionally, the vertical positions of junctions 404 are staggered such that the plane of wear encounters only a small fraction of junctions 404 at a given point in time, and these constitute a small fraction of the total contacting area. The consistency of contact area provided by lattice polishing texture 400 allows polishing of several substrates with similar polishing characteristics and reduces or eliminates the need to periodically dress or condition the pad. For many applications, however, a polymeric bristle brush in combination with a water jet facilitates cleaning the pad. This reduction in conditioning extends the pad's life and lowers its operating cost.

Furthermore, perforations through the pad, the introduction of conductive-lined grooves or the incorporation of a conductor, such as conductive fibers, conductive network, metal grid or metal wire, can transform the pads into eCMP ("electrochemical mechanical planarization") polishing pads. These pads' three-dimensional network structure can facilitate fluid flow and maintain a consistent surface structure for demanding eCMP applications. The increased fluid flow improves the removal of spent electrolyte from the eCMP process that can improve uniformity of the eCMP process.

Preferably, no solid material exists within the lattice polishing structure 400 that is not contained within polishing elements 402. Optionally, it is possible to secure abrasive particles or fibers to polishing elements 402. Correspondingly, no void volume exists within any individual element 402; all void volume in lattice polishing structure 400 preferably exists between and distinctly outside polishing elements 402. Optionally, however, polishing elements 402 may have a hollow or porous structure. Polishing elements 402 are rigidly affixed at one end to a base layer that maintains polishing elements 402 in a substantially upright orientation. The junctions 404 may include an adhesive or chemical bond to secure polishing elements 402. Preferably, junctions 402 represent an interconnection of the same materials and most preferably a seamless interconnection of the same materials.

It is preferred that width and pitch of the polishing elements 402 be uniform, or nearly so, across all polishing elements 402 from end to end between junctions 404, or uniform across subgroups of polishing elements 402. For example, preferably polishing elements 402 have a width and pitch that remain within 50% of the average width or pitch, respectively, between junctions 404 in the lattice structure 400. More preferably, polishing elements 402 have a width and pitch that remain within 20% of the average width or pitch, respectively, between junctions 404 in the lattice structure 400. Most preferably, polishing elements 402 have a width and pitch that remain within 10% of the average width or pitch, respectively, between junctions 404 in the lattice structure 400. In particular, maintaining cross-sectional area of polishing elements 402 between adjacent junctions 404 to within 30% facilitates consistent polishing performance. Preferably, the pad maintains cross sectional area to within 20% and most preferably to within 10% between adjacent junctions 404. Furthermore, polishing elements 402 preferably have a linear shape to further facilitate consistent polishing. A direct consequence of these features is that the cross-sectional area of the polishing elements 402 does not vary considerably in the vertical direction. Thus as polishing elements 402 are worn during polishing, there is little change in the area presented to the wafer. This consistency in contact area provides for a uniform polishing surface and allows consistent polishing for repeated polishing operations. For example, the uniform structure allows polishing of multiple patterned wafers without adjusting the tool settings. Preferably the total cross sectional area of polishing elements 402 remains within 25 percent between the initial polishing surface or contact elements and the half-height of the lattice structure 400. Most preferably, the total cross sectional area of polishing elements 402 remains within 10 percent between the initial polishing surface and the half-height of the lattice structure 400. As noted previously, it is further preferable that the vertical positions of junctions 404 are also staggered to reduce the change in total cross sectional area as the elements wear down.

Optionally, it is possible to arrange polishing elements 402 in spaced groupings of several polishing elements 402—for example, the polishing elements may comprise circular groupings surrounded by areas free from polishing elements. Within each grouping, the junctions 404 maintain the spacing and effective stiffness of the groupings of elements 402. In addition, it is possible to adjust the density of the polishing elements 402 in different regions to fine tune removal rates and polishing or wafer uniformity. For example, a circular polishing pad may have four polishing elements per junction in a center region and three polishing elements per junction in the remaining region. Furthermore, it is possible to arrange the polishing elements in a manner that forms open channels or grooves, such as circular channels, X-Y channels, radial channels, curved-radial channels or spiral channels. The introduction of the optional channels facilitates removal of large debris and can improve polishing or wafer uniformity.

It is preferable that vertical height and slope of polishing elements 402 be uniform across all elements. It is preferred that height and slope remain within 20% of the average height, more preferably, remains within 10% of the average height, and slope and even more preferably, remains within 1% of the average height and slope within lattice structure 400. Optionally, a cutting device, such as a knife, high-speed rotary blade or laser may periodically cut the polishing elements to a uniform height. Furthermore, the diameter and speed of the cutting blade can optionally cut the polishing elements at an angle to alter the polishing surface. For example, cutting polishing elements having a circular cross section at an angle will produce a texture of polishing tips that interact with the substrate. Uniformity of height ensures that all polishing elements 402 of lattice structure 400, as well as all interconnecting contact elements in the plane of wear, have the potential to contact the workpiece. In fact, because industrial CMP tools have machinery to apply unequal polish pressure at different locations on the wafer, and because the fluid pressure generated under the wafer is sufficient to cause the wafer to depart from a position that is precisely horizontal and parallel to the mean level of the pad, it is possible that some polishing elements 402 do not contact the wafer. However in any regions of polishing pad 104 where contact does occur, it is desired that as many polishing elements 402 as possible be of sufficient height to provide contact. Furthermore, since the unbutressed ends of polishing elements 402 will typically bend with the dynamic contact mechanics of polishing, an initial polish surface area will typically wear to conform to the bend angle. For example, an initial circular top surface will wear to form an angled top surface and the changes in direction experienced during polishing will create multiple wear patterns.

The dimensions and spacing of polishing elements 402 are chosen to provide both high contact area between the pad and wafer and adequate open flow area for slurry to remove polish debris. Typically, the polishing elements 402 constitute less than 80 percent of the polishing pad volume in the polishing lattice 400. Preferably the polishing elements 402 constitute less than 75 percent of the polishing pad volume in the polishing lattice 400. For example, typically elements 402 will occupy 5 to 75 percent of the polishing pad volume measured above the polishing lattice 400. Polishing pads designed for high contact area typically occupy 40 to 80 percent of the polishing pad volume measured in cross section parallel to the polishing pad's polishing surface or platen 130. There is an intrinsic trade-off between these objectives: adding more polishing elements 402 in the available space of lattice structure 400 augments the total contact area but reduces the flow area creating more obstacles to slurry flow and the removal of polish debris. An essential feature of the present invention is that polishing elements 402 be sufficiently slender and widely spaced to allow a favorable balancing of contact area and flow area. Pursuant to this balance, the ratio of the pitch of polishing elements 402 to the width of polishing elements 402 may optionally be at least 2. With these limits, the contact area of polishing lattice 400 may reach 50% or greater and the flow area may be 50% of the available area or greater. Typically, polishing elements 402 act to collect or trap polishing debris at a location below the surface of the pad. This feature facilitates a decrease in defectivity by trapping harmful debris in a location that will not contact or scratch the surface of an article during polishing. It is further possible that the ratio of the height to the width of the polishing elements 402 may optionally be at least four 4, to maximize the flow area and allow polish debris to be conveyed horizontally among the polishing elements 402 while still providing vertical distance between this conveyed debris and the wafer.

The lattice structure 400 may be further optimized by choosing the cross-sectional shape of polishing elements 402 to be streamlined with respect to slurry flow that occurs predominantly in the horizontal direction. Streamlining of bodies to achieve minimum fluid drag is a well-established discipline of engineering and forms part of the science routinely applied in the design of aircraft, watercraft, automobiles, projectiles, and other objects that move in or relative to a gas or liquid. The equations of fluid flow governing these latter human-scale objects apply identically at the scale of CMP pad macrostructure or microstructure. In essence streamlining consists in choosing a gradually curved cross-section free of sharp transitions such that an external fluid flow may pass around the cross-section without separating from the surface and forming recirculating eddies that consume fluid energy. Pursuant to this consideration, a circular cross-section is preferred over a square or rectangular cross-section for polishing elements 402. Further streamlining of the shapes of polishing elements 402 requires knowledge of the local direction of the slurry flow. Since both the pad and wafer are rotating, the slurry flow may approach the polishing elements 402 from a variety of angles and the correct streamlining for one angle of approach will be sub-optimal for other angles of approach. The only shape that is streamlined equally to all directions of fluid approach is a circular cross-section, thus it is preferred in the general case. If the dominant flow direction can be determined, as in the case of a CMP process having a very high ratio of platen speed to carrier speed, it is more preferred to streamline the cross-section of polishing elements 402 with respect to that direction.

The polishing pad 104 includes an interconnected-multi-element lattice structure 400 and may optionally include a subpad (not illustrated). It is noted that the lattice structure 400 may be secured directly to a platen of a polisher, e.g., platen 130 of FIG. 1. Lattice structure 400 may be secured to a subpad in any suitable manner, such as adhesive bonding, e.g., using a pressure sensitive adhesive layer or hot-melt adhesive, heat bonding, chemical bonding, ultrasonic bonding, etc. The base layer or subpad may serve as the polishing base for attachment of the polishing elements 402.

Various methods of manufacture are possible for lattice structure 400. For larger-scale networks, these include micromachining, laser or fluid-jet etching, and other methods of material removal from a starting solid mass; and focused laser polymerization, filament extrusion, fiber spinning, preferential optical curing, biological growth, and other methods of material construction within an initially empty volume. For smaller-scale networks, crystallization, seed polymerization, lithography, positive printing, negative printing or other techniques of preferential material deposition may be employed, as well as electrophoresis, phase nucleation, or other methods of establishing a template for subsequent material self-assembly. Tests have demonstrated stereolithography to provide an effective method for manufacturing the lattice structures 400.

The polishing elements 402 of lattice structure 400 may be made of any suitable material, such as polycarbonates, polysulfones, nylons, polyethers, polyesters, polystyrenes, acrylic polymers, polymethyl methacrylates, polyvinylchlorides, polyvinylfluorides, polyethylenes, polypropylenes, polybutadienes, polyethylene imines, polyurethanes, polyether sulfones, polyamides, polyether imides, polyketones, epoxies, silicones, copolymers thereof (such as, polyetherpolyester copolymers), and mixtures thereof. Polishing elements 402 may also be made of a non-polymeric material such as ceramic, glass, metal, stone, wood, or a solid phase of a simple material such as ice. Polishing elements 402 may also be made of a composite of a polymer with one or more non-polymeric materials.

In general, the choice of material for polishing elements 402 is limited by its suitability for polishing an article made of a particular material in a desired manner. Similarly, the optional subpad may be made of any suitable material, such as the materials mentioned above for polishing elements 402. Polishing pad 104 may optionally include a fastener for securing the pad to a platen, e.g., platen 130 of FIG. 1, of a polisher. The fastener may be, e.g., an adhesive layer, such as a pressure sensitive adhesive layer, hot melt adhesive, a mechanical fastener, such as the hook or loop portion of a hook and loop fastener. It is also within the scope of the invention to implement one or more fiber-optic endpointing devices or similar transmission devices that occupy one or more of the void spaces of lattice structure 400.

Figure 5:
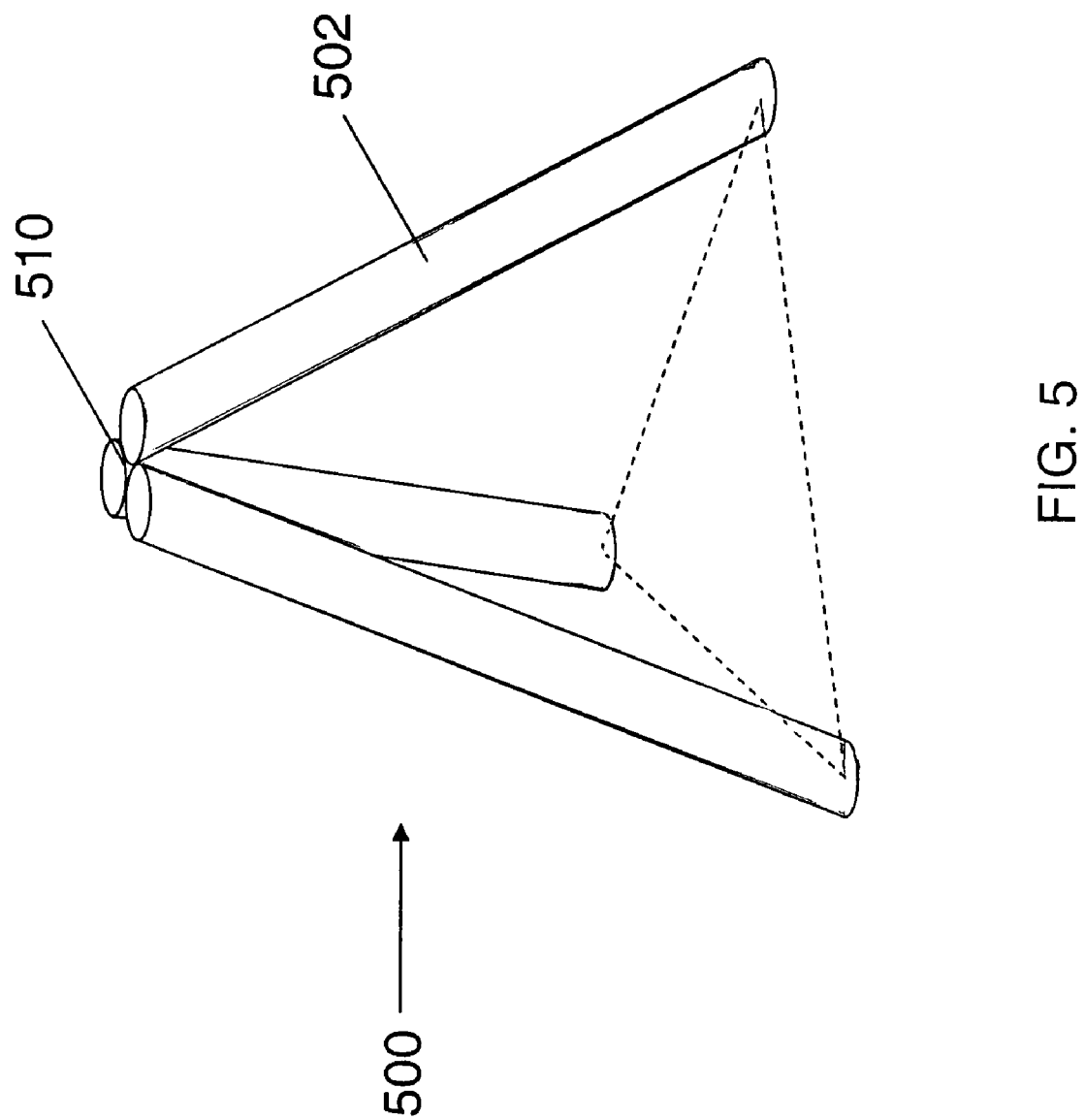
FIG. 5 is a schematic illustration of three polishing elements that form a vertex without intersecting.
Figure 5A:
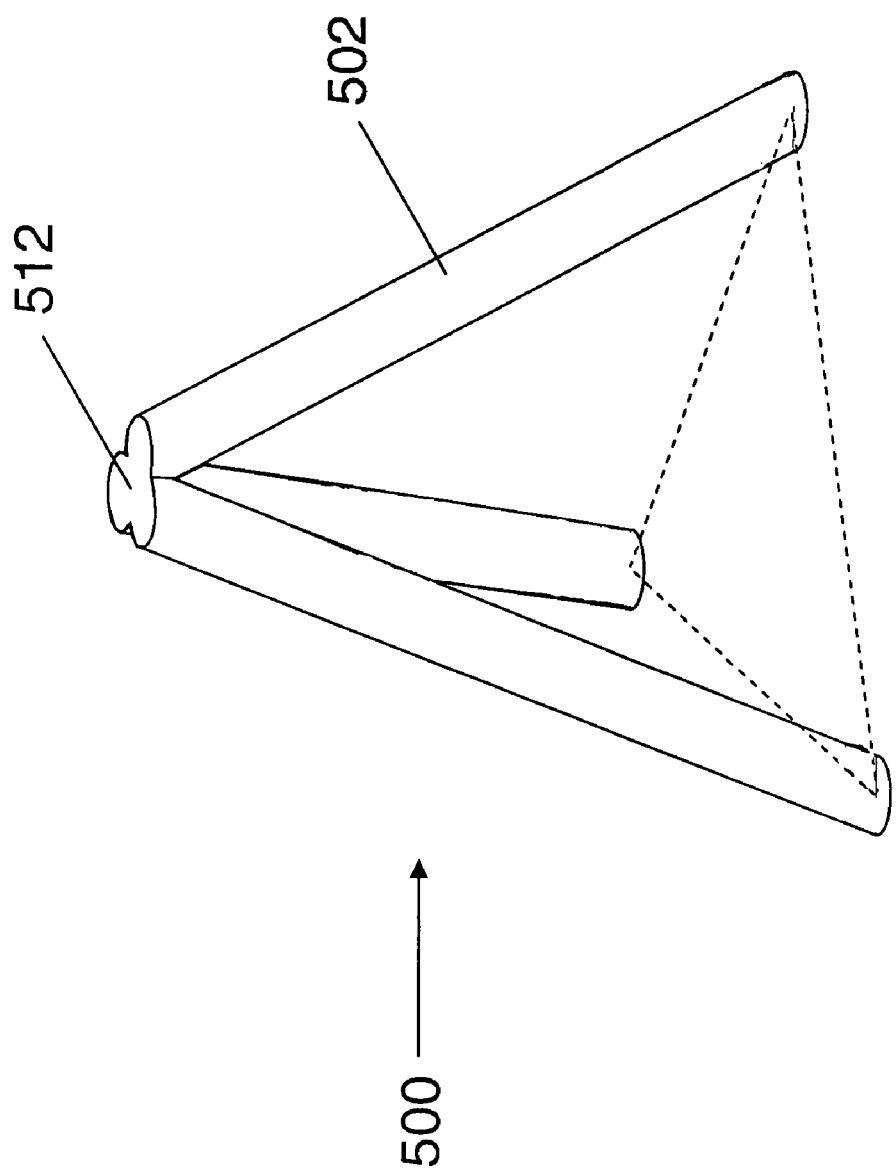
FIG. 5A is a schematic illustration of three polishing elements having modified ends to form a junction or vertex.

To achieve truly invariant contact area, the members of any given multi-element assembly should be tangent but non-intersecting at the vertex. This is shown in FIG. 5. At any elevation along the height of multi-element assembly 500, the total potential contact area is the cross-sectional area of one element 502 in the horizontal plane (i.e. parallel to the plane of polishing) multiplied by the number of elements 502. Any overlap of the element cross-sections where they meet at vertex 510 reduces the total potential contact area. Practically, however, it is desirable to have some merging of elements 502 at vertex 510 for good structural integrity. This is shown in FIG. 5A. Therefore these features must be balanced to keep a reasonably constant cross-section while allowing strong joints at the vertices. Alternatively, elements 502 may be flared at the ends approaching vertex 512 so that despite partial overlap of their cross-sections, the total presented contact area in a horizontal plane is approximately constant with elevation.

Figure 6:
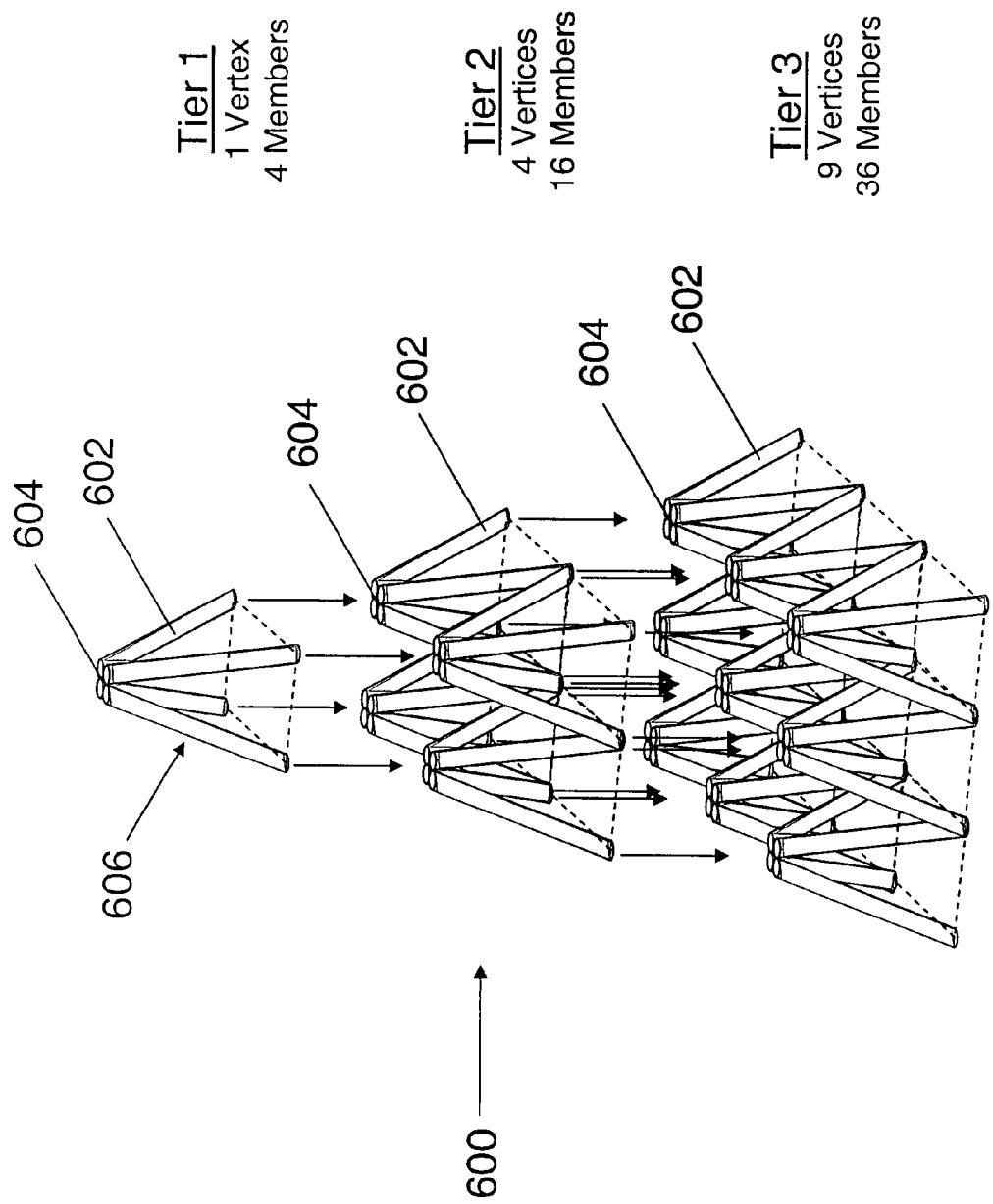
FIG. 6 is a schematic illustration of three tiers of an interconnected-multi-element lattice network of the invention having four polishing elements per junction with the tiers separated for illustrative purposes.
Figure 6A:
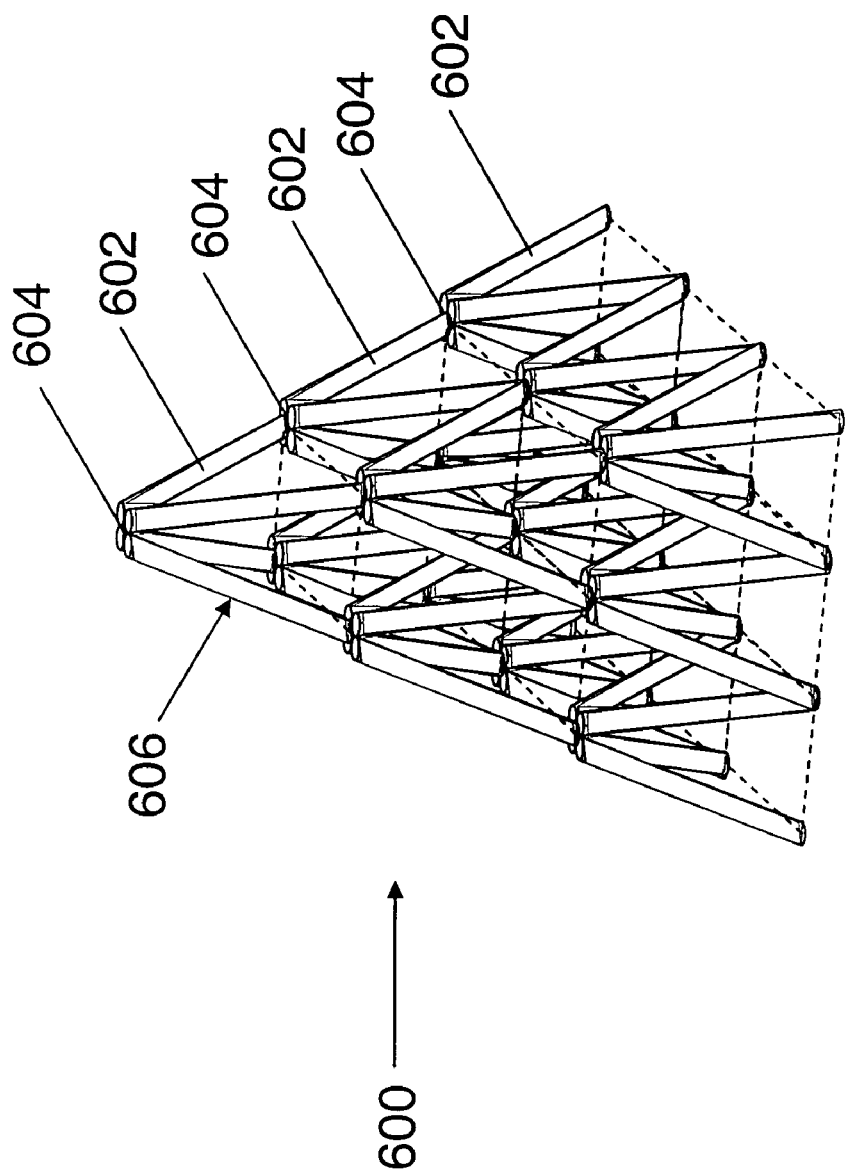
FIG. 6A is a schematic illustration of three tiers of an interconnected-multi-element lattice network of FIG. 6 with four polishing elements connected at junctions.

An alternative embodiment of the present invention is shown in FIGS. 6 and 6A having four elements in each multi-element assembly. Lattice polishing texture 600 is comprised of unit cells 606 each consisting of four elements 602 meeting at a junction or vertex 604. Each junction or vertex 604 branches to a set of other junctions 604 which in turn branch to a broader set and so forth. Preferably, the polishing members align from tier-to-tier at each multi-element junction. Load applied to a junction or vertex 604 on the top tier of the lattice structure 600 is distributed into a geometrically expanding number of junctions or vertices 604 in each tier below. For example, in a pyramidal lattice structure 600, load applied to a junction or vertex 604 in the top tier is transmitted through four elements 602 to four junctions or vertices 604 in the next tier. From each of these, the load is transmitted through four member cells, or sixteen polishing elements 602 total, to nine junctions or vertices 604 in the next tier. From these nine junctions or vertices 604, load is transmitted through thirty-six polishing elements 602 to sixteen junctions or vertices 604 in the next tier, and so forth. This feature of load distribution makes the lattice structure 600 as a whole desirably stiff, an asset to high planarization efficiency. However at the top tier, the slender members are locally flexible and allow good contact with the workpiece and excellent defectivity performance.

Figure 7:
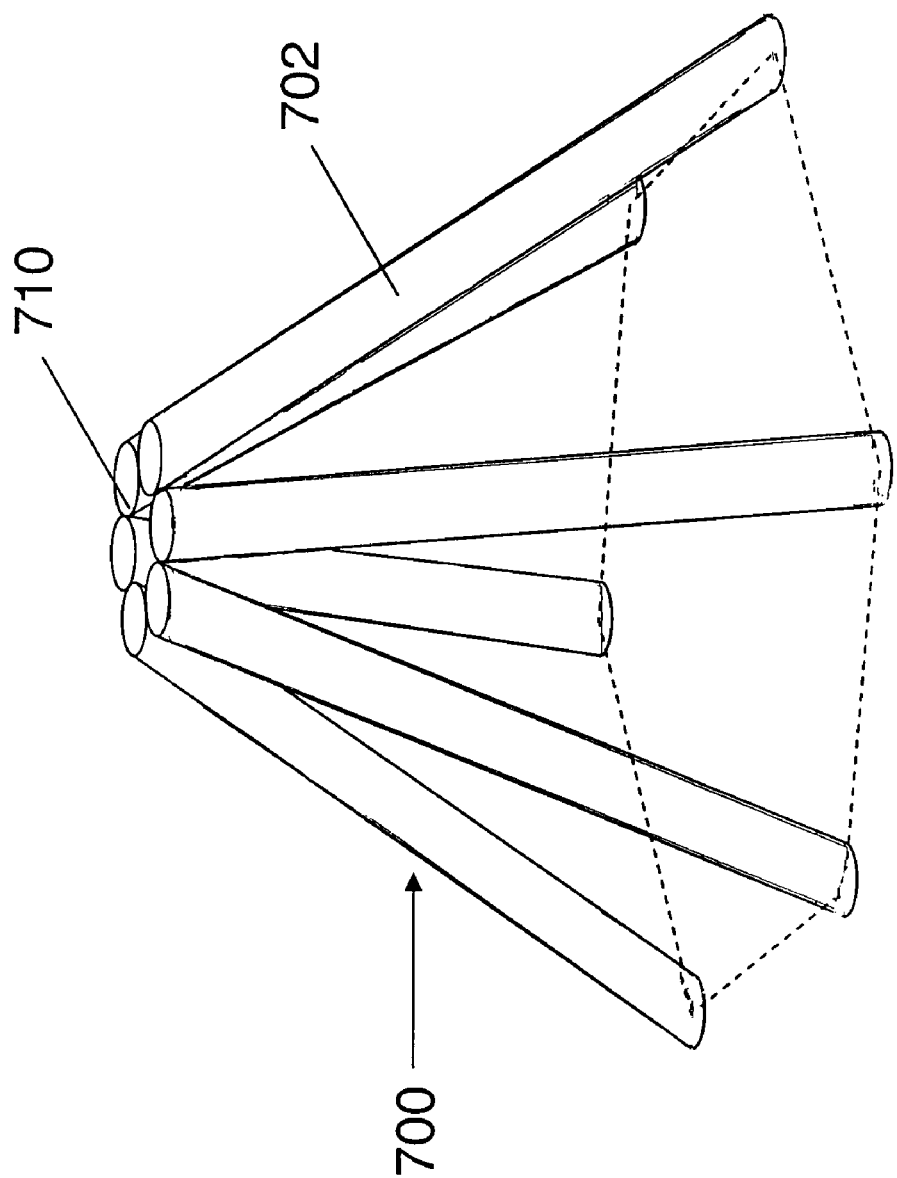
FIG. 7 is a schematic illustration of six polishing elements that form a vertex without intersecting.

A multi-element assembly with six members is shown in FIG. 7. The assembly 700 consists of six elements 702 meeting at a junction or vertex 710. By analogy to the lattice structures 500 and 600 shown in FIGS. 5 and 6 respectively, the assembly 700 is suitable for a tiered arrangement in which elements 702 have a lower end resting on the junctions or vertices 710 of the tier below to provide favorable transmission of load through the lattice.

The invention provides the advantage of decoupling contact mechanics from fluid mechanics. In particular, it allows effective fluid flow within the pad to easily remove polishing debris. In addition, it allows adjustment of the polishing elements' stiffness, height and pitch to control contact mechanics with a substrate. Furthermore, the polishing elements' shape allows the reduction or elimination of conditioning for increased polishing pad life. Finally, the uniform cross sectional area allows polishing of multiple substrates, such as patterned wafers with similar polishing characteristics.

The invention claimed is:

1. A polishing pad useful for polishing at least one of a magnetic, optical and semiconductor substrate in the presence of a polishing medium, the polishing pad comprising:
   a) a plurality of polishing elements, the polishing elements being aligned in a vertical direction and having a first and a second end;
   b) a plurality of junctions connecting the first and second ends of the polishing elements with at least three polishing elements at each of the plurality of junctions and forming a tier, each tier representing a thickness in the vertical direction between the first and second ends of the polishing elements; and
   c) an interconnected lattice structure formed from connecting sequential tiers of the plurality of junctions that connect the polishing elements.

2. The polishing pad according to claim 1, wherein the junctions connect three to six polishing elements.

3. The polishing pad according to claim 1, wherein polishing elements align with polishing elements above and below each junction.

4. The polishing pad according to claim 1, wherein each polishing elements includes a series of landings.

5. The polishing pad according to claim 1, wherein the interconnected lattice lacks horizontal polishing elements.

6. A polishing pad useful for polishing at least one of a magnetic, optical and semiconductor substrate in the presence of a polishing medium, the polishing pad comprising:
   a) a plurality of polishing elements, the polishing elements being aligned in a vertical direction and having a first and a second end;
   b) a plurality of junctions connecting the first and second ends of the polishing elements with at least three polishing elements at each of the plurality of junctions and forming a tier, each tier representing a thickness in the vertical direction between the first and second ends of the polishing elements; and
   c) an interconnected lattice structure formed from connecting sequential tiers of the plurality of junctions that connect the polishing elements with the polishing elements aligning in a constant direction through multiple junctions.

7. The polishing pad according to claim 6, wherein the junctions connect three to six polishing elements.

8. The polishing pad according to claim 6, wherein the junctions connect three polishing elements.

9. The polishing pad according to claim 6, wherein each polishing element includes a series of landings.

10. The polishing pad according to claim 6, wherein the interconnected lattice lacks horizontal polishing elements.

* * * * *